March 29, 1960     B. W. BRION     2,930,420
COLLAPSIBLE SAW
Filed June 16, 1958     2 Sheets-Sheet 1
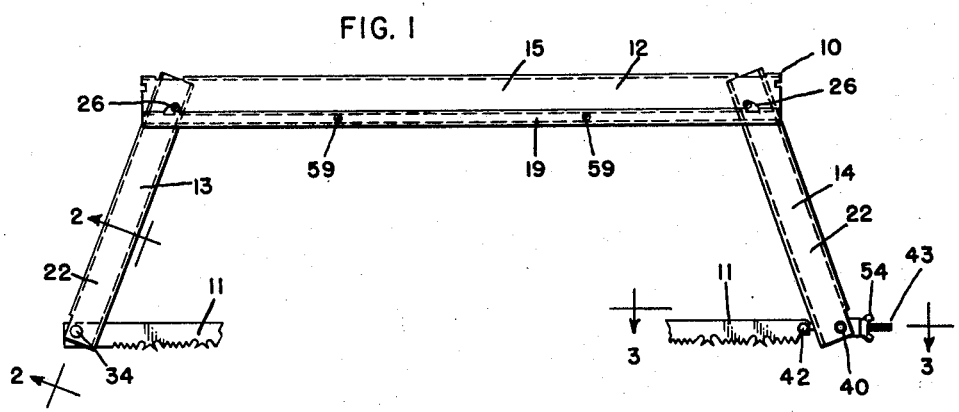
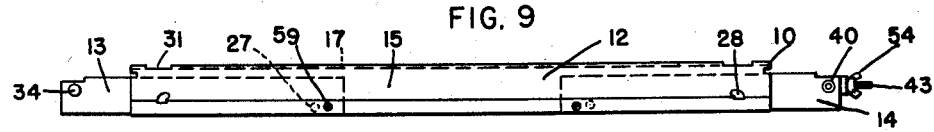
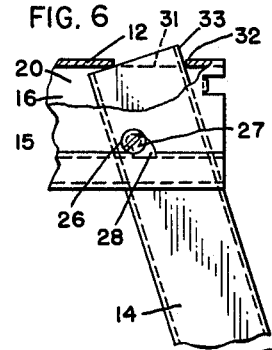
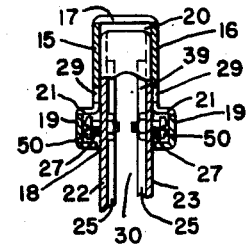
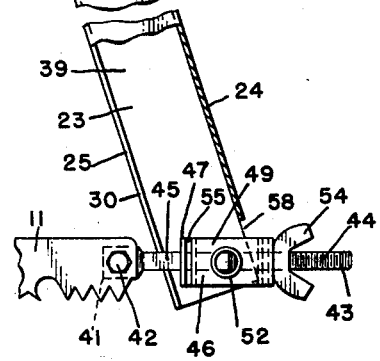
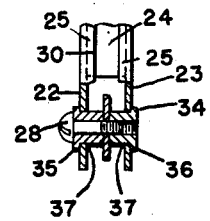
INVENTOR
BENJAMIN W. BRION
*Caswell & Lagaard*
ATTORNEYS March 29, 1960 B. W. BRION 2,930,420
COLLAPSIBLE SAW
Filed June 16, 1958 2 Sheets-Sheet 2
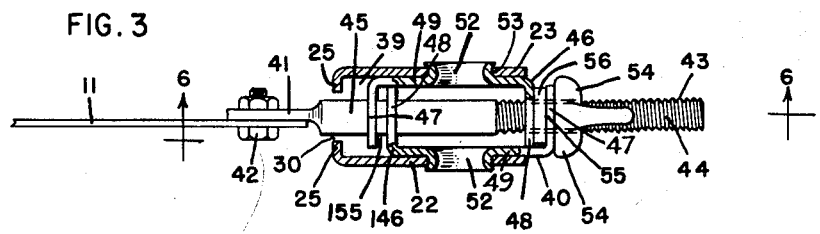
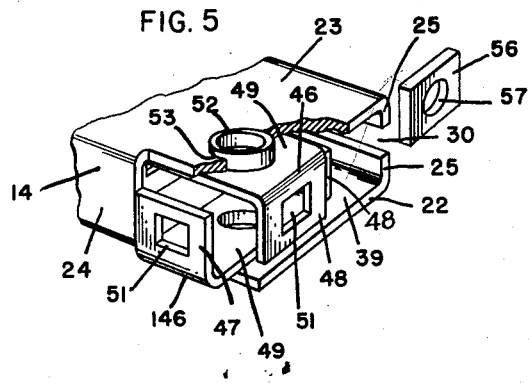
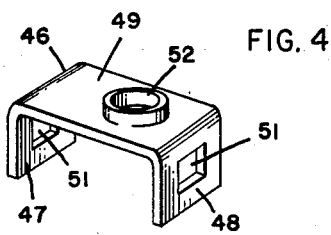
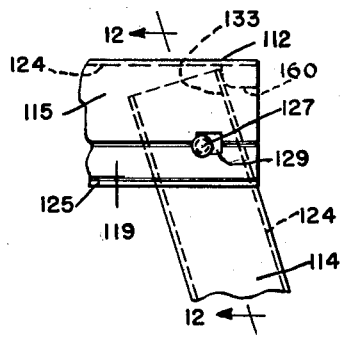
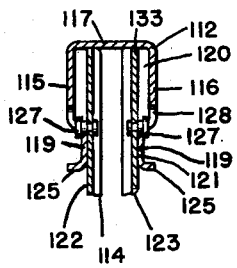
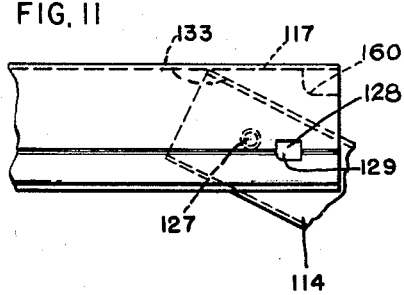
INVENTOR
BENJAMIN W. BRION
Caswell + Lagaard
ATTORNEYS the United States Patent Office 2,930,420
Patented Mar. 29, 1960

2,930,420
COLLAPSIBLE SAW
Benjamin W. Brion, Minneapolis, Minn.
Application June 16, 1958, Serial No. 742,414
10 Claims. (Cl. 145—33)

The herein disclosed invention relates to collapsible saws and particularly to a saw utilizing a narrow elongated blade carried by a collapsible frame.

An object of the invention resides in providing a construction in which the saw blade need not be detached from the frame in the collapsing of the saw.

Another object of the invention resides in constructing the frame with an elongated back and with arms detachably connected at one end of each thereof to the ends of said back and pivotally connected at their other ends to said saw blade, so that the arms may be moved into substantial alignment with each other and with the attached ends in juxtaposition and substantially parallel with said back and saw blade.

Another object of the invention resides in constructing the back U-shaped in form and provided with spaced flanges and a web connecting said flanges and disposed at the outermost portion thereof.

A feature of the invention resides in constructing the back with sockets and in providing the arms with trunnions adapted to enter said sockets and in further providing said back with abutments engaging the ends of said arms and restraining swinging movement of said arms toward each other.

Another object of the invention resides in constructing said arms U-shaped in construction having spaced flanges adapted to lie along the flanges of the back when the saw is collapsed and with a web therebetween adapted to lie along the web of the back.

Another object of the invention resides in providing connecting means between the saw blade and the outer ends of the arms arranged so as to cause the blade to be received within the confines of the arms when the saw is collapsed.

A still further object of the invention resides in the construction forming the connection between the saw blade and one of the arms and the tensioning means.

Other objects of the invention reside in the novel combination and arrangement of parts and in the details of construction hereinafter illustrated and/or described.

In the drawings:

Fig. 1 is a side elevational view of a collapsible saw illustrating an embodiment of the invention and showing the saw frame in erected position.

Fig. 2 is a fragmentary detail sectional view taken on line 2—2 of Fig. 1 and drawn to a greater scale.

Fig. 3 is a fragmentary detail sectional view taken on line 3—3 of Fig. 1 and drawn to a greater scale.

Fig. 4 is a perspective view of one of the fittings used for attaching the saw blade to one of the arms.

Fig. 5 is a perspective view of a portion of one of the side arms showing the method of attaching the saw to the same.

Fig. 6 is a fragmentary view of one end of the saw taken substantially on line 6—6 of Fig. 3 and drawn to the same scale as Fig. 3.

Fig. 7 is a detail view similar to Fig. 6 showing the connection between the back and the side arms and with the parts in altered position as viewed in Fig. 6 to permit of collapsing the saw.

Fig. 8 is a cross-sectional view taken on line 8—8 of Fig. 7.

Fig. 9 is an elevational view similar to Fig. 1 and showing the saw in collapsed position.

Fig. 10 is a view similar to Fig. 6 illustrating a modification of the invention.

Fig. 11 is a view similar to Fig. 7 of the structure shown in Fig. 10.

Fig. 12 is a cross-sectional view taken on line 12—12 of Fig. 10.

The invention consists of a saw frame 10 and which supports a saw blade 11. The saw frame 10 comprises an elongated back 12 and two arms 13 and 14. The back 12 is U-shaped in cross-section and is formed with spaced flanges 15 and 16 connected together by means of a web 17. By means of this construction, the back is formed with a space 20 within the same and a slot 18 between the outer edges thereof. The back 12 is arranged so that the web 17 is outermost and the slot 18 is innermost. Near the free edges of the flanges 15 and 16 offsets 19 are provided which have inwardly facing grooves 21 adjacent the slot 18 and which form a track or guideway serving a purpose to be presently described.

The arms 13 and 14 are identical in construction and only the arm 14 will be described in detail through the same reference numerals will be used to designate the corresponding parts. This arm is constructed similar to the back 12 and is U-shaped in cross-section having spaced flanges 22 and 23 and a web 24 connected thereto. The inner edges of said flanges have lips 25 extending inwardly thereof and which are spaced from another to form a slot 30 therebetween entering the space 39 within said arm. The arms 13 and 14 are of such dimensions that the same may be inserted into the space 20 between the flanges 15 and 16 of the back 12 through the slot 18.

Detachable connections 26 are provided between the arms 13 and 14 and the back 12. These connections are similar in construction and only the connection used in conjunction with the arm 14 has been illustrated in detail and will be described. Attached to the flanges 22 and 23 of the arm 14 are two aligning trunnions or fulcrums 27. These trunnions extend outwardly from the surfaces of said flanges and are adapted to slide along the grooves 21 formed in the offsets 19 on the flanges 15 and 16 of the back 12. At the ends of the back 12, the flanges 15 and 16 are formed with notches 28 which terminate in arcuate sockets 29. These notches extend into the offsets 19 while the sockets 29 are confined to the flanges proper. The trunnions 27 may hence pass through the notches 28, out of the grooves 21, and into the sockets 29. Heads 50 formed on the ends of the trunnions 27 engage the outer surfaces of the flanges 15 and 16 and hold said trunnions within the sockets 29.

The web 17 of the back at the locality of the sockets 29 is formed with a slot 31 which extends across the back and which forms an abutment 32 at the outer end of said slot. When the parts are assembled, as shown in Fig. 6, the trunnions 27 enter into the sockets 29 and the extreme end 33 of the web 24 engages the abutment 32. When so disposed, the arms 13 and 14 are restrained from swinging movement toward each other and the trunnions 27 being out of the grooves 21, the parts are likewise held from relative sliding movement. It will be noted that the sockets 29 are longitudinally disposed inwardly from the major portions of the notches 28. This prevents the trunnions 27 from dropping out of the sockets and the connection 26 from becoming detached. When, however, the two arms are urged together, the parts are held in proper assembled relation. A similar connection is provided for the arm 13.

Connecting means 34, best shown in Fig. 2, is provided between the end of the arm 13 and one end of the saw blade 11. This connecting means comprises two flanged bushings 35 and 36 which extend through openings 37 in the flanges 22 and 23 of the arm 13. A bolt 28 extends through the bushing 35 and the end of the saw blade 11 and is screwed into the bushing 36 which is tapped for the purpose. The saw blade is hence pivoted for swinging movement on the bolt 28 and is held centered between the flanges 22 and 23 by the bushings 35 and 36. By means of this construction, the saw blade may swing into the space 39 within the arm 13 through the slot 30.

The other end of the saw blade is connected by connecting means 40 to the outer end of the arm 14. This construction is best shown in Figs. 3, 4, 5, 6, 7 and 8. This connecting means includes a longitudinally extending bolt 43 which is provided at one end with a flat 41 and which is further provided with a square shank 45 and a threaded portion 44. A transverse bolt 42 extends through the hole in the end of the saw blade 11 and through said flat and holds the blade 11 attached to the bolt 43. For connecting the bolt 43 to the arm 14, two fittings 46 and 146 are employed, which are identical in construction and of which the fitting 46 is shown in detail in Fig. 4. This fitting is U-shaped in form having flanges 47 and 48 with a web 49 connecting the same. The flanges 47 and 48 have square aligning holes 51 therethrough and which receive the shank 45 of the bolt 43 and the threaded portion 44. The webs 49 have formed on them trunnions 52 which are adapted to enter holes 53 in the outer end of the flanges 22 and 23 of the arm 14. It will be noted that the trunnions 52 are not centered on the webs 49 so that when the two fittings 46 and 146 are assembled, as shown in Fig. 3, the trunnions are in alignment. In this position, the flanges 47 and 48 of the adjoining fittings are formed with spaces 55 and 155 therebetween. In applying the connection 40 to the arm 14 and back 12, fitting 146 is first inserted into space 39 crosswise of the arm 14 with its trunnion 52 received in the proper hole 53. Fitting 46 is then inverted and inserted into space 39 lengthwise of said arm and with its trunnion received in the other hole 53. Fitting 46 is then rotated clockwise, as viewed in Fig. 5, ninety degrees causing its flange 48 to rest on the web 49 of fitting 146 and the web 49 of fitting 46 to rest on the flange 48 of fitting 146. This prevents the trunnions 52 from disengagement with the holes 53. The parts are then disposed as shown in Fig. 3. The space 55 is closed by means of a filler 56 which has a hole 57 extending through the same and through which the threaded portion 44 of the bolt 43 extends. The connecting means 40 comprising the two fittings 46 and 146 extends through the opening 58 formed in the web 24 of arm 14. When the bolt 43 is inserted into the holes 51 in the flanges 47 and 48 and through the hole 57 in filler 56 the parts are held in assembled relation. A nut 54 screwed on the threaded portion 44 of bolt 43 serves to tighten the saw blade and hold the arms assembled relative to the back.

The method of using the invention is as follows: The saw in collapsed position is shown in Fig. 9. When in such position, the trunnions 27 are disposed within the grooves 21. To erect the saw, the nut 54 is loosened which permits swinging the two arms 13 and 14 out of the confines of the back 12. Said arms may now be swung about the trunnions 27 while the same slide along the grooves 21. When these trunnions reach the notches 28, the parts are substantially in the position shown in Fig. 7. The arms are now raised until the trunnions enter the notches 28 whereupon the same may be moved into the sockets 29. At the same time, the ends 33 of the arms are brought into engagement with the abutments 32. The nut 54 is now tightened and the parts are tensioned and held in position ready for use. When the saw is desired to be collapsed the procedure is reversed. With the parts arranged as shown in Fig. 9 the nut 54 can be tightened. In such case, the trunnions 27 on the arms 13 and 14 engage stops 59 attached to the flanges 15 and 16 of back 12 and serve to hold the parts in fixed collapsed position.

In Figs. 10, 11 and 12 a modification of the invention has been shown in which a different type of connection between the arms and the back of the frame has been illustrated. With this form of the invention, the arms are the same as arms 13 and 14 and the same reference numerals preceded by the digit "1" will be used to designate the same and the parts thereof. The back 112 of this form of the invention is constructed with flanges 115 and 116 which are connected to a web 117. These flanges are spaced further apart than the flanges 15 and 16. At the outer ends of said flanges are formed inwardly extending offsets 119 which terminate in outwardly extending lips 125. The flanges 122 and 123 of the arms 113 and 114 fit snugly within the groove 121 formed between said offsets. Set into the flanges 122 and 123 of the arms 113 and 114 are trunnions 127 which are adapted to enter into notches 128 formed in the flanges 115 and 116 of the back 112. These notches extend into the offsets 119 to form sockets 129 lying in continuation of the notches 128. When the trunnions 127 are moved into the sockets 129 the ends 133 of the webs 124 of the arms 113 and 114 engage stops 160 attached to the inner surface of the web 117 of back 112 and restrain movement of said arms toward each other. When said trunnions are moved outwardly of the sockets 129 through notches 128 and into the space 120 between the flanges 115 and 116 of said back, the arms may be slid along the back and collapsed as with the other form of the invention.

The advantages of the invention are manifest. The saw is extremely compact and occupies a minimum amount of space. The saw blade need not be detached from the arms of the frame in order to collapse the saw. When the saw is collapsed, the blade is concealed and protected within the confines of the arms. The various arms and back form convenient handles for operating the saw. The saw can be quickly erected or collapsed as the occasion requires. The saw is largely constructed of sheet metal which can be formed in the desired shape at a minimum expense.

Changes in the specific form of the invention, as herein described, may be made within the scope of what is claimed without departing from the spirit of the invention.

Having described the invention, what is claimed as new and desired to be protected by Letters Patent is:

1. In a collapsible saw, a frame comprising an elongated U-shaped back formed with spaced flanges and a web at the outer portion thereof, a pair of arms one for each end of the back and adapted to be received in the space between the flanges of said back, sockets in said flanges, fulcrums on said arms near certain ends thereof insertable into or removable from said sockets, abutments on said back engageable with the ends of said arms, and together with said sockets and fulcrums restraining swinging movement of said arms toward each other, a saw blade, connecting means between the ends of said saw blade and the other ends of said arms, tensioning means acting between said saw blade and frame for tensioning said saw blade and urging said fulcrums into said sockets and the first named ends of said arms against said abutments, said fulcrums upon detachment from said sockets accommodating movement of said arms into alignment and into parallelism with said saw blade and the insertion of the blade and arms into the space between said flanges of the back.

2. In a collapsible saw, a frame comprising an elongated U-shaped back formed with spaced flanges and an outwardly facing web connecting the same, said back having a space within the same and an inwardly facing opening communicating therewith, a pair of U-shaped arms one for each end of the back and adapted to be received in the space within said back through the opening therein, said arms having flanges lying along and within the flanges of said back and outwardly facing webs connecting the same, said arms being formed with spaces within the same and having inwardly facing openings communicating therewith, sockets formed at the ends of the flanges of said back, fulcrums on the flanges of said arms, said sockets being open at certain portions thereof for the reception of said fulcrums, abutments on the web of said back, the ends of said arms carrying said fulcrums being engageable with said abutments and operating with said fulcrums to restrain movement of the arms when in erected position relative to said back, toward one another, said arms when disconnected from said sockets being adapted to be moved into substantial alignment and to be received within the space within said back and through the opening therein to collapse the saw, a saw blade, pivotal connecting means between the ends of said saw blade and the other ends of said arms and tensioning means acting between said saw blade and one of said arms for tensioning said saw blade and urging said fulcrums into said sockets and the first named ends of said arms against said abutments, said saw blade being adapted to be moved into the space in said arms through the openings therein and guarded thereby when the saw is collapsed.

3. In a collapsible saw, a frame comprising an elongated back, a track extending along the same and having a groove therein, a pair of arms, a fulcrum at one end of each of said arms, bearing means at each end of said back for engagement with said fulcrums, and supporting said arms for swinging movement, restraining means acting between said arms and back and restraining movement of said arms toward one another, said fulcrums being movable from engagement with said bearing means and into said slot, said slot guiding the ends of said arms having the fulcrums toward one another and said arms into substantial alignment, a saw blade, and pivoted connections between the ends of said saw blade and the other ends of said arms.

4. In a collapsible saw, a frame having a back and arms extending outwardly from the ends thereof and pivotally and slidably movable relative thereto, restraining means acting between said back and arms when the arms are at the ends of said back and restraining movement of the arms toward one another; one of said arms having spaced flanges, a saw blade, connecting means between one end of said saw blade and the free end of said flanged arm and comprising two fittings each having spaced flanges and a web therebetween, said fittings being disposed with the flanges thereof overlying one another and with the webs parallel and spaced from one another, the flanges of said arm having aligning holes therein, trunnions formed on the webs of said fittings and received in said holes, the flanges of said fittings having aligning holes therein, a bolt extending through the holes in the flanges of said fitting and connected to said saw blade, and means connecting the other end of the saw blade to the free end of the other arm.

5. In a collapsible saw, a frame including an elongated slotted back and a pair of slotted arms with the slot in the back and said arms being so dimensioned that the arms fit within said back, connection means pivotally and slidably mounting said arms in said back, restraining means acting between said arms and back when the arms are in extended operative positions and restraining movement of the arms toward one another, a saw blade, and means pivotally mounting said blade on the extremities of said arms remote from said back, said connection means and said pivotal mounting means permitting collapsing of the frame with the blade attached such that said arms are positioned in the said back and said blade in the slots of said arms.

6. In a collapsible saw, a frame including an elongated slotted back and a pair of slotted arms with the slot in the back and said arms being so dimensioned that the arms fit within said back, connection means pivotally and slidably mounting said arms in said back, restraining means acting between said arms and back when the arms are in extended operative positions and restraining movement of the arms toward one another, a saw blade, means pivotally mounting said blade on the extremities of said arms remote from said back, said connection means and said pivotal mounting means permitting collapsing of the frame with the blade attached such that said arms are positioned in said back and said blade in the slots of said arms, and means for maintaining said blade and said arms in collapsed position within said back.

7. In a collapsible saw, a frame including an elongated slotted back and a pair of slotted arms with the slot in the back and said arms being so dimensioned that the arms fit within said back, connection means pivotally and slidably mounting said arms in said back, a saw blade, means pivotally mounting said blade on the extremities of said arms remote from said back, said connection means and said pivotal mounting means permitting collapsing of the frame with the blade attached such that said arms are positioned in said back and said blade in the slots of said arms, stop means included in said back and cooperating with said arms and said connection means to position said arms relative to said back in an assembled position with said blade positioned remote from and substantially parallel to the said back, and means including said pivotal mounting means for said blade to hold said frame in assembled position.

8. In a collapsible saw, a frame including an elongated slotted back and a pair of slotted arms with the slot in the back and said arms being so dimensioned that the arms fit within said back, connection means pivotally and slidably mounting said arms in said back, restraining means acting between said arms and back when the arms are in extended operative positions and restraining movement of the arms toward one another, a saw blade, means pivotally mounting said blade on the extremities of said arms remote from said back, said connection means and said pivotal mounting means permitting collapsing of the frame with the blade attached such that said arms are positioned in said back and said blade in the slots of said arms, and stop means included in said back to retain said arms in said back.

9. A collapsible saw including an elongated U-shaped back and a pair of elongated U-shaped arms with a saw blade attached to one extremity of each of said arms, and means pivotally and slidably mounting said arms in said back and pivotally mounting said blade on said arms, the arms being slidable to fit in said back and rotatable to cause said blade to enter into said slots of said arms when said arms are in a collapsed position, and restraining means acting between said arms and back when the arms are in extended operative positions and restraining movement of the arms toward one another.

10. A connector for connecting one end of a saw blade to an arm of a saw frame in which the arm has spaced flanges with aligning holes therein, said connector comprising two fittings each having spaced flanges and a web therebetween, said fittings being disposed with the flanges thereof overlying one another and with the webs parallel and spaced from one another, trunnions formed on the webs of said fittings and received in said holes, a bolt extending through the holes in the flanges of said fitting and having a transverse hole therein through which a fastener may be inserted for securing the saw blade to the bolt.

References Cited in the file of this patent

UNITED STATES PATENTS

| | | |
|---|---|---|
| 1,051,761 | Refsabl | Jan. 28, 1913 |
| 1,087,648 | Duffy | Feb. 17, 1914 |
| 1,429,195 | Donaldson | Sept. 12, 1922 |